(12) United States Patent
Hung

(10) Patent No.: US 9,199,105 B1
(45) Date of Patent: Dec. 1, 2015

(54) SAFETY HOOK

(71) Applicant: YOKE INDUSTRIAL CORP., Taichung (TW)

(72) Inventor: Wei-Chieh Hung, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 14/320,157

(22) Filed: Jun. 30, 2014

(51) Int. Cl.
*F16B 45/02* (2006.01)
*A62B 35/00* (2006.01)
*F16B 45/04* (2006.01)

(52) U.S. Cl.
CPC ............. *A62B 35/0068* (2013.01); *F16B 45/02* (2013.01); *F16B 45/04* (2013.01)

(58) Field of Classification Search
CPC . F16B 45/02; F16B 21/165; Y10T 24/45366; Y10T 24/4534; Y10T 24/45361; Y10T 24/3484; Y10T 24/3492; Y10T 24/45257; Y10T 24/45277; Y10T 24/45346; Y10T 24/45372; A62B 35/0068
USPC ............. 24/375, 369, 428, 490, 598.1, 598.5, 24/599.1, 599.5, 599.9, 600.2, 601.1, 24/601.5
See application file for complete search history.

(56) References Cited

U.S. PATENT DOCUMENTS

| | | | | |
|---|---|---|---|---|
| 2,490,931 A * | 12/1949 | Thompson | .................... | 24/599.5 |
| 4,035,595 A * | 7/1977 | Tolfsen | .................. | 200/61.58 B |
| 5,579,564 A * | 12/1996 | Rullo et al. | ................... | 24/599.5 |
| 9,032,595 B2 * | 5/2015 | Lin | .............. | 24/600.1 |
| 2008/0104809 A1 * | 5/2008 | Lin | .............. | 24/600.1 |
| 2008/0120818 A1 * | 5/2008 | Belcourt et al. | ............. | 24/599.5 |
| 2011/0126386 A1 * | 6/2011 | Liang | ........................... | 24/599.5 |
| 2012/0102688 A1 * | 5/2012 | Yang | ........................... | 24/600.1 |
| 2012/0210542 A1 * | 8/2012 | Yang | ............................. | 24/369 |
| 2013/0025095 A1 * | 1/2013 | Yang | ........................... | 24/599.5 |
| 2013/0160252 A1 * | 6/2013 | Lin | .............. | 24/601.5 |
| 2013/0219673 A1 * | 8/2013 | Perner | ............................. | 24/375 |

* cited by examiner

*Primary Examiner* — Victor Batson
*Assistant Examiner* — David Upchurch
(74) *Attorney, Agent, or Firm* — Ming Chow; Sinorica, LLC

(57) ABSTRACT

A safety hook includes a hook member, a latch member, and a switch, wherein the both the latch member and the switch are pivoted on the hook member, and the latch member is moved between a lock position and an unlock position by pressing the switch. The hook member is covered by a insulating member, and the insulating member includes two insulating layers with different colors to warn the user by the color change if the outer insulating layer is worn. The latch member and the switch are covered by insulating members as well to avoid electric shock.

8 Claims, 6 Drawing Sheets

SAFETY HOOK

BACKGROUND OF THE INVENTION

1. Technical Field

The present invention relates generally to a hook, and more particularly to a safety hook with an insulating member.

2. Description of Related Art

For the workplace at high altitude, the workers have to fasten themselves to a firm support, such as a cable, with a rope and a safety hook to protect them from falling The conventional safety hooks are made of metal, and as we know, most metals are conductor, so that the workers are in a risk of getting an electric shock while they engage the safety hook with an electric cable. It put the workers in another dangerous condition.

BRIEF SUMMARY OF THE INVENTION

In view of the above, the primary objective of the present invention is to provide a safety hook, which is insulating to protect the user from an electric shock.

The secondary objective of the present invention is to provide a safety hook, which shows a level of wearing by observing the change of the insulating member.

The present invention provides a safety hook, including a hook member having a body and a first insulating member covering a surface of the body; a switch pivoted on the hook member and having a second insulating member covering a surface of the switch, wherein the switch has a guiding slot, and the guiding slot has a start point at an end, an end point at an opposite end, and a turn point between the start point and the end point; a latch member pivoted on the hook member to be moved between a lick position and an unlock position and having a third insulating member covering a surface of the latch member, wherein the latch member has a connecting end; and a positioning pin inserted into the latch member and the guiding slot of the switch, whereby the latch member is moved between the lock position and the unlock position while the switch is moved; the latch member is moved to the lock position while the positioning pin is at the start point of the guiding slot, and the latch member is moved to the unlock position while the positioning pin is at the end point of the guiding slot.

In an embodiment, the body of the hook member is made of metal; the first insulating member includes a first insulating layer and a second insulating layer; the first insulating layer covers the surface of the body, and the second insulating layer covers the first insulating layer; and the first insulating layer and the second insulating layer have different colors.

In an embodiment, the first insulating layer has a plurality of protrusions projected from an outer surface thereof, and the second insulating layer has a plurality of openings; and the protrusions engage the openings respectively.

In an embodiment, distal ends of the protrusions are even with an outer surface of the second insulating layer.

In an embodiment, the latch member has a body, which is made of metal, and the body includes two side plates; the third insulating member covers both the side plates; the latch member is provided with a pivoting bore through the side plates and the third insulating member; the hook member is provided with a positioning bore through the body, the first insulating layer, and the second insulating layer; a pin inserted into the pivoting bore and the positioning bore to pivot the latch member on the hook member; the latch member is provided with a through bore adjacent to the connecting end; the through bore extends through the sides plates and the third insulating member; the positioning pin is inserted into the through bore and the guiding slot of the switch; the latch member has a stop portion and a resting portion; the resting portion rests against the hook member when the latch member is at the lock position.

In an embodiment, the safety hook further includes a plurality of insulating lids engaging opposite ends of the positing bore and the through bore.

In an embodiment, the hook member has a positioning bore through the body, the first insulating layer, and the second insulating layer; the switch includes a body, which is made of metal, and the body includes two side plates; the second insulating member covers both the side plates; the switch has a pivoting bore through the side plates and the second insulating member; a pin is inserted into the pivoting bore and the positioning bore to pivot the switch on the hook member; the guiding slot of the switch extends through the side plates and the second insulating member; the latch member is provided with a through bore; the positioning pin is inserted into the through bore and the guiding slot.

In an embodiment, the safety hook further includes a plurality of insulating lids engaging opposite ends of the pivoting bore and the through bore.

With such design, it may ensure the worker works safely with the safety hook of the present invention without the risk of getting electric shock.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 1 to FIG. 6, a safety hook 100 of the preferred embodiment of the present invention includes a hook member 10, a switch 20, and a latch member 30.

Figure 1:
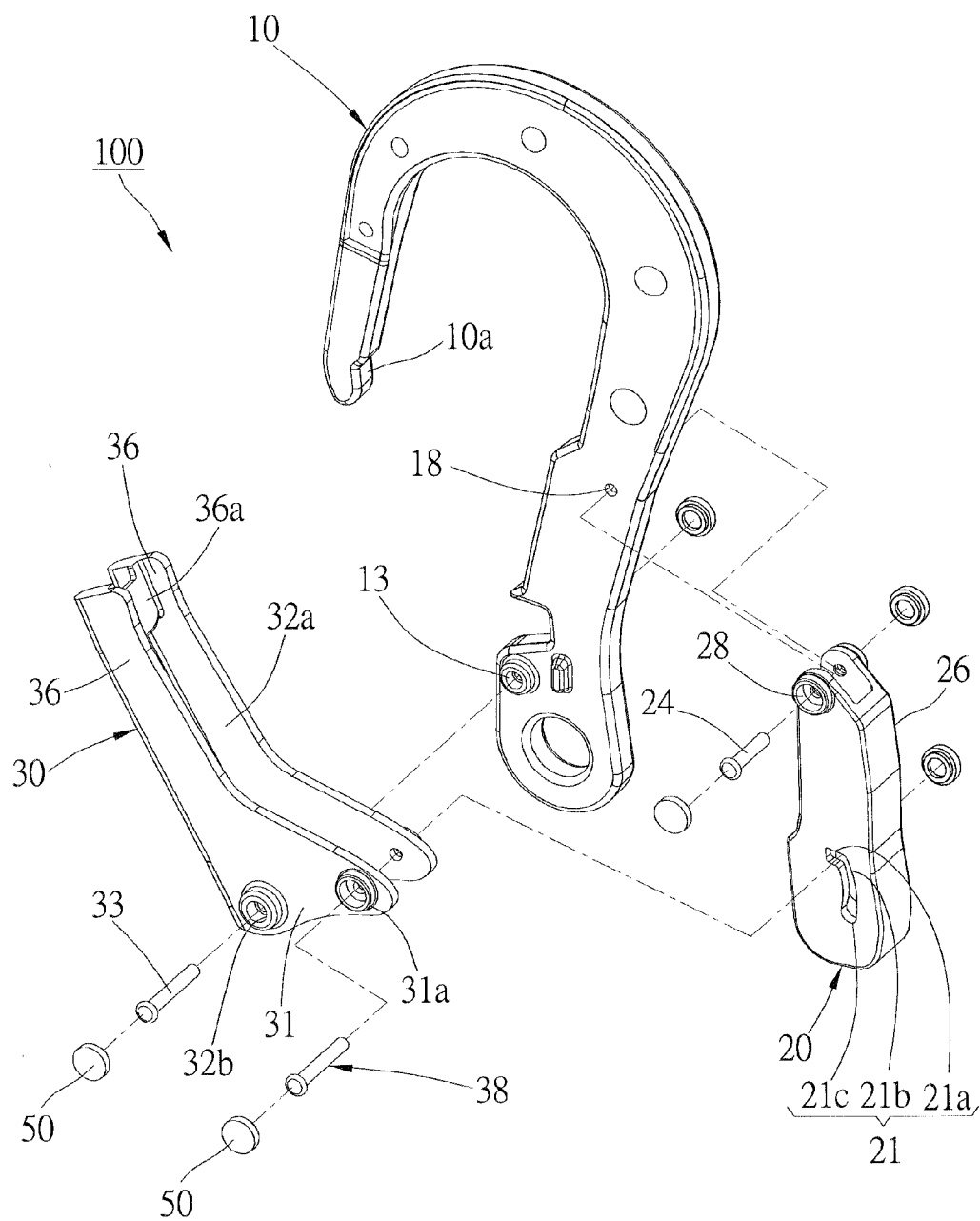
FIG. 1 is an exploded view of a preferred embodiment of the present invention.
Figure 4:
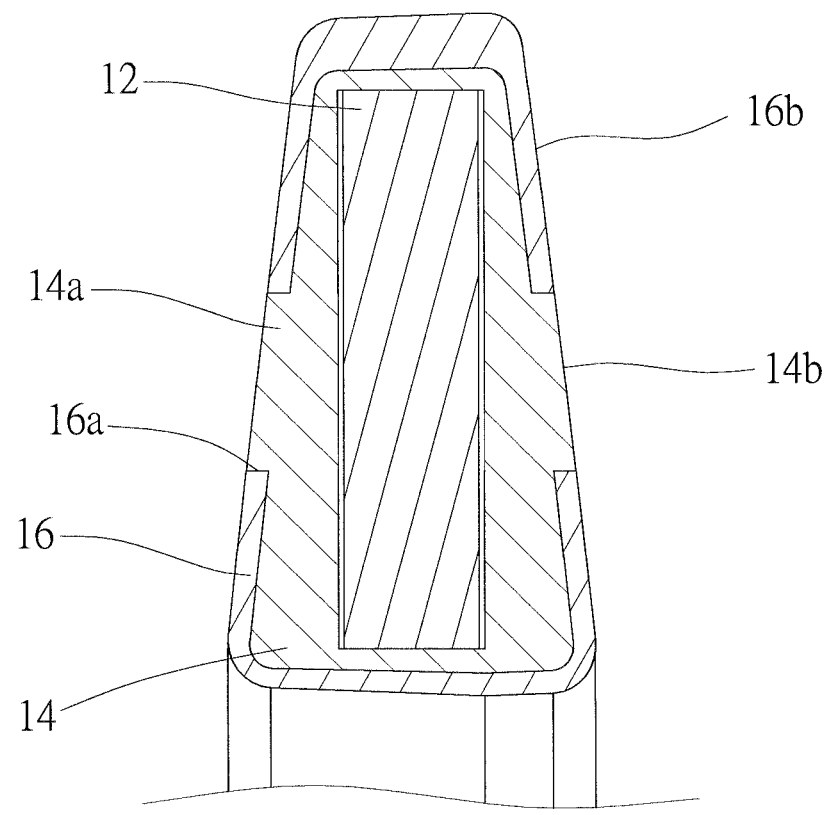
FIG. 4 is a sectional view along the 4-4 line in FIG. 2, showing the second insulating layer and the protrusions at the same level.

As shown in FIG. 1 and FIG. 4, the hook member 10 has a body 12 and a first insulating member covering a surface of the body 12. In an embodiment, the first insulating member includes a first insulating layer 14 and a second insulating layer 16, wherein the first insulating layer 14 covers the surface of the body 12, and the second insulating layer 16 covers the first insulating layer 14. The first insulating layer 14 and the second insulating layer 16 have different colors, and those colors are different from that of the body 12. The first insulating layer 14 has a plurality of protrusions 14*a* projected from an outer surface thereof, and the second insulating layer 16 has a plurality of openings 16a. The protrusions 14a engage the openings 16a respectively, and the protrusions 14a are exposed via the openings 16a to let the user may observe the color of the first insulating layer 14. In an embodiment, distal ends 14b of the protrusions 14a and an outer surface of the second insulating layer 16 are even (FIG. 4). In an embodiment, the first insulating layer 14 and the second insulating layer 16 are formed by injection molding. The projections 14a of the first insulating layer 14 are helpful to the process of molding the second insulating layer 16. In addition, the hook member 10 further has a positioning bore 18 through the body 12, the first insulating layer 14, and the second insulating layer 16.

Figure 5:
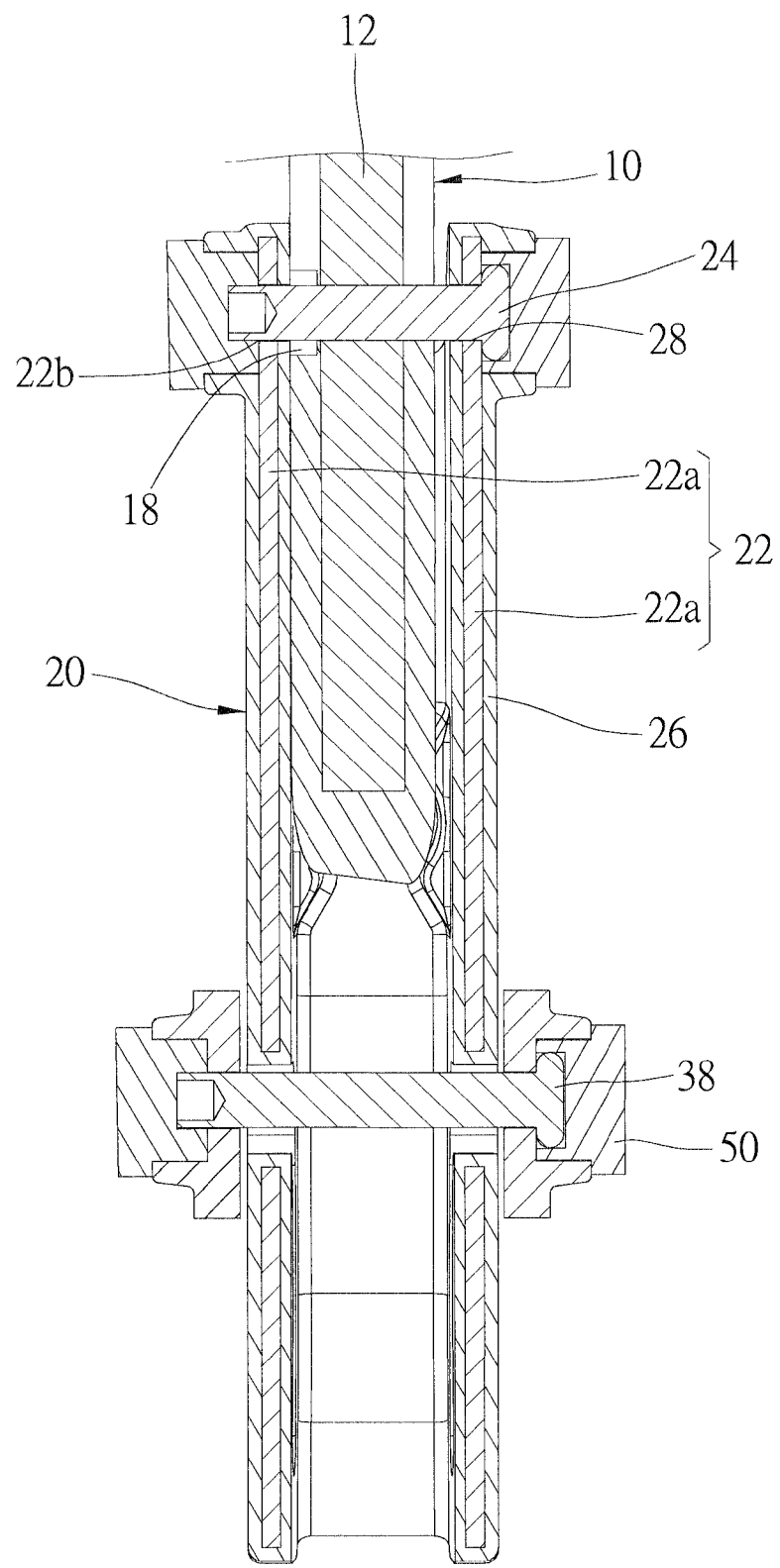
FIG. 5 is a sectional view of along the 5-5 line in FIG. 2, showing the second insulating member covering the second metallic member.

As shown in FIG. 1 and FIG. 5, the switch 20 has a body 22, a pin 24, and a second insulating member 26. The body 22 includes two parallel side plates 22a and an edge plate connected to ends of the side plates 22a, and the second insulating member 26 covers all the surfaces of the side plates 22a and the edge plate (including the sidewalls of the bore and slot thereon). The switch 20 is provided with a pivoting bore 28 through the side plates 22a and the second insulating member 26. The pivoting bore 28 is aligned with the positioning bore 18 of the hook member 10, and the pin 24 is inserted into both of them to pivot the switch 20 on the hook member 10. Each side plate 22a is provided with an L-shaped guiding slot 21 having a start point 21a at an end of the guiding slot 21, a turn point 21b at a bending position of the L shape of the guiding slot 21, and an end point at an opposite end of the guiding slot 21.

Figure 2:
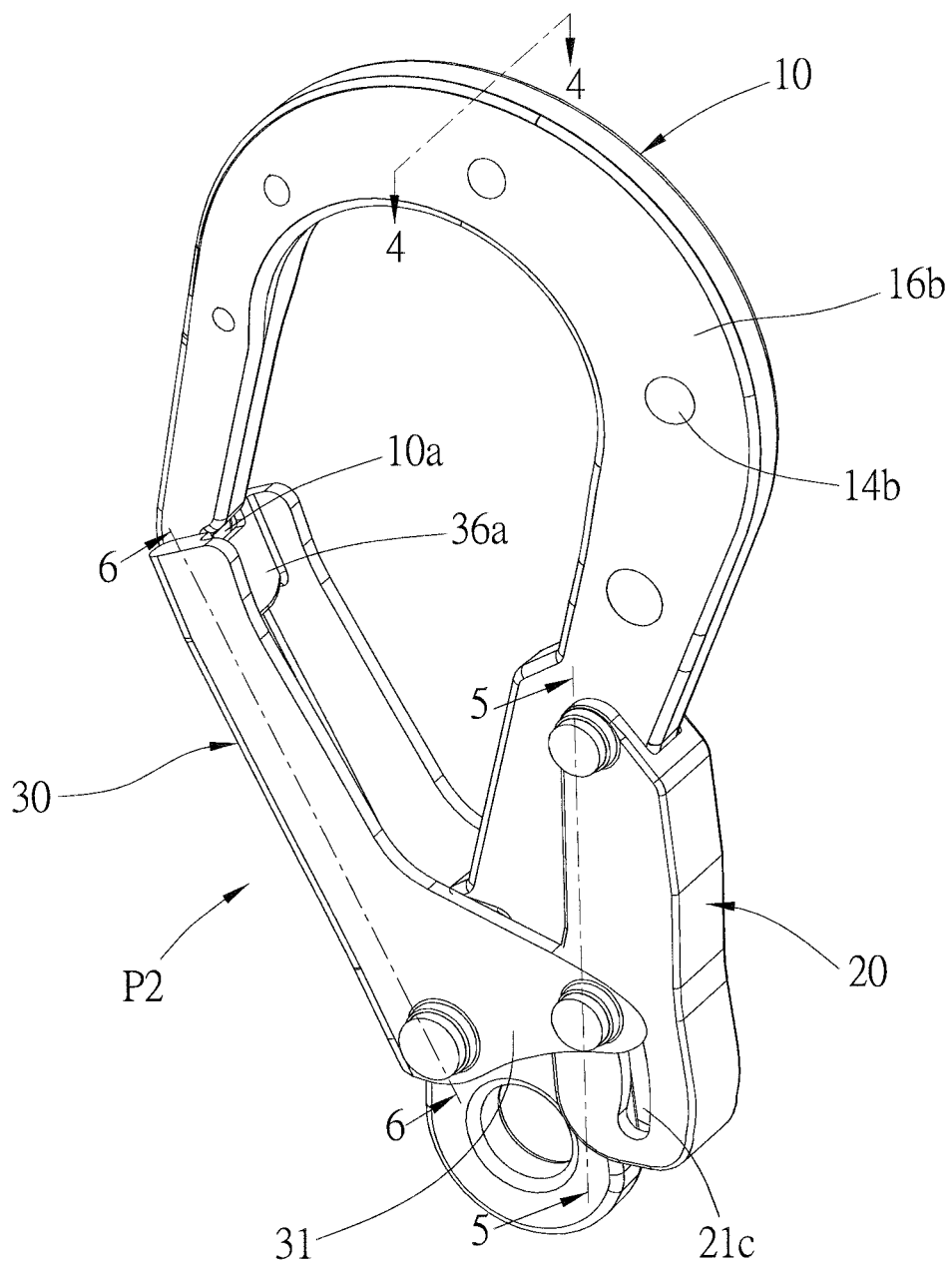
FIG. 2 is a perspective view of the preferred embodiment of the present invention, showing the latch member at the lock position.
Figure 3:
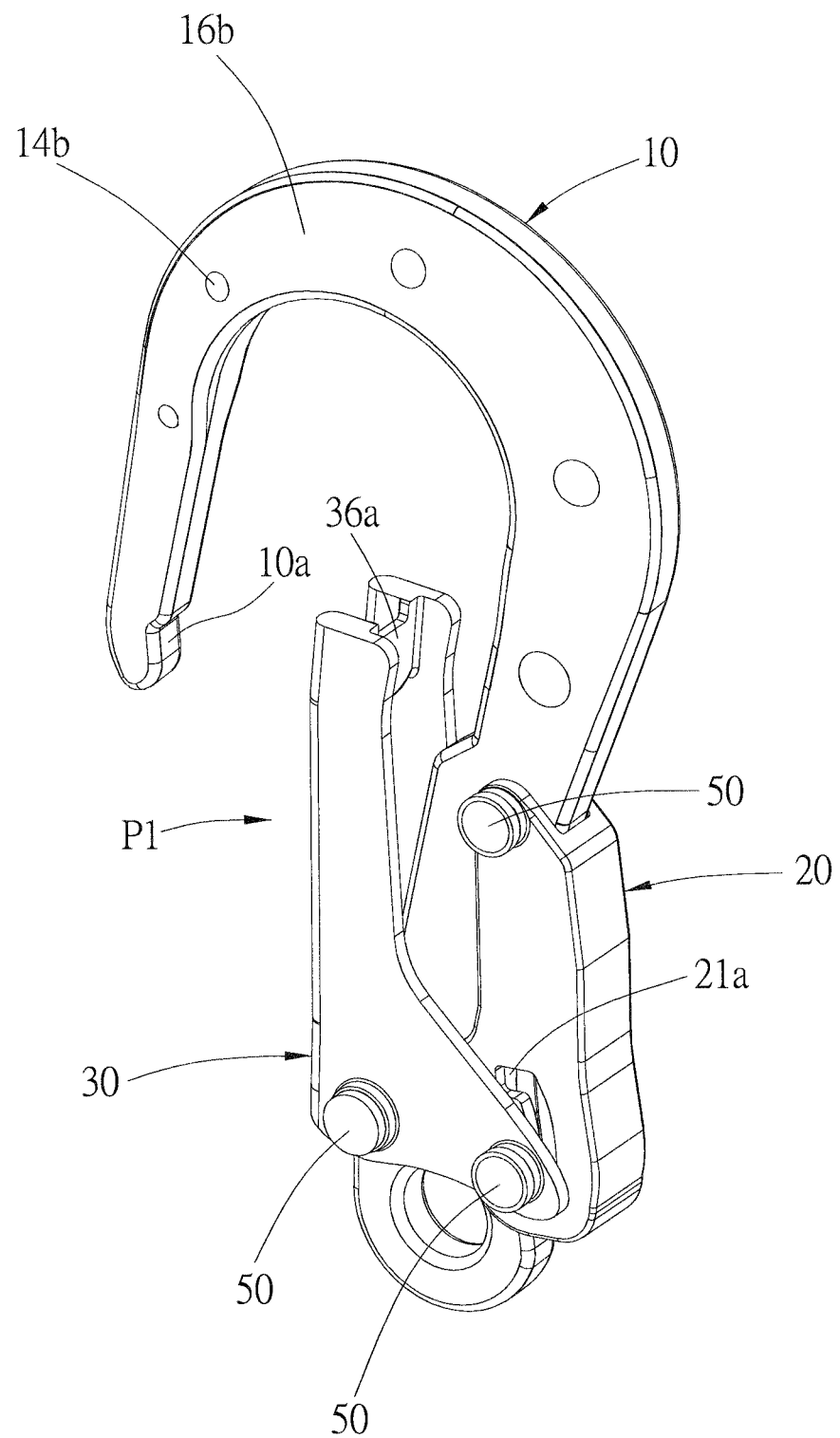
FIG. 3 is a perspective view of the preferred embodiment of the present invention showing the latch member at the unlock position.
Figure 6:
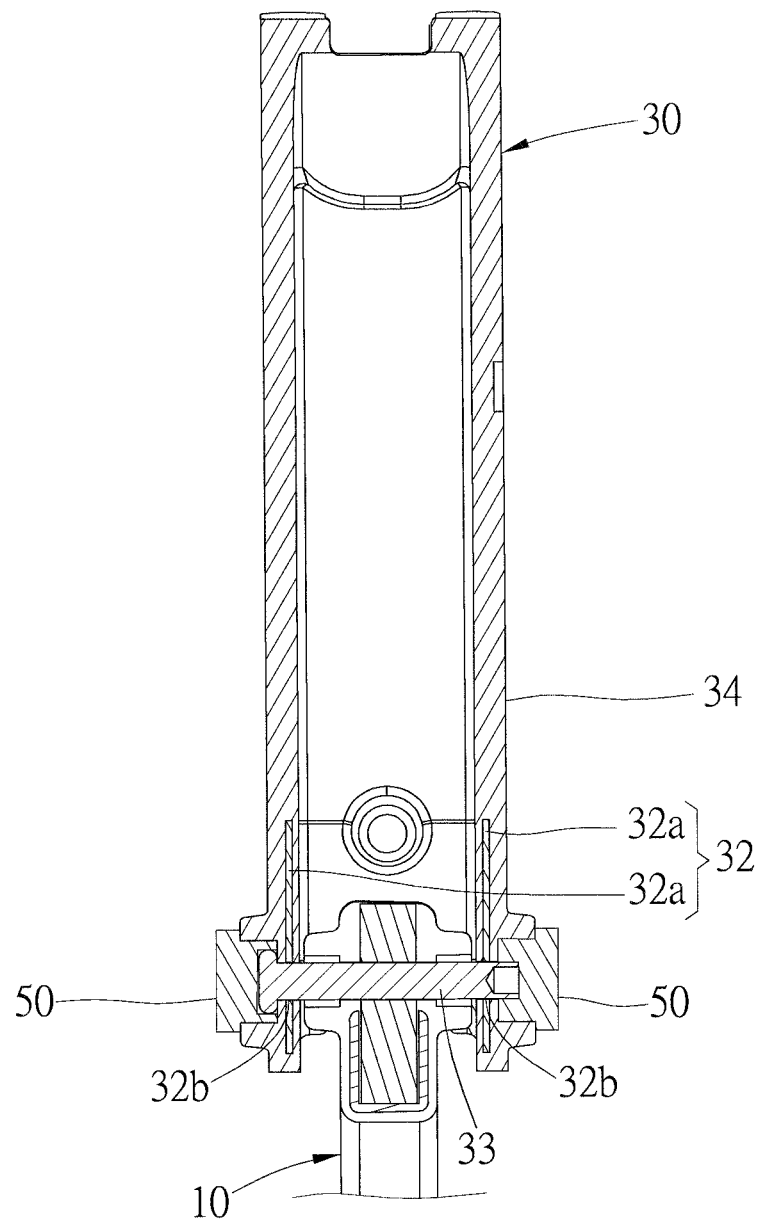
FIG. 6 is a sectional view of along the 6-6 line in FIG. 2, showing the third insulating member covering the first metallic member.

As shown in FIG. 1 and FIG. 6, the latch member 30 has a body 32 and a third insulating member 34. The body 32 includes two parallel side plates 32a and the third insulating member 34 covers all the surfaces of the side plates 32a. The latch member 30 further is provided with a pivoting bore 32b through the side plates 32a and the third insulating member 34. The hook member 10 has a positioning bore 13 aligned with the pivoting bore 32b of the latch member 30, and a pin 33 is inserted into both of them to pivot the latch member 30 on the hook member 10 and let the latch member 30 move between an unlock position (FIG. 3) and a lock position (FIG. 2). The latch member 30 has two stop portions 36 and a resting portion 36a connected to ends of the stop portions 36. In an embodiment, the latch member 30 could have at least a portion without the metallic body. In other words, the latch member 30 could have one or more portions, where are not asked for a strong structure, made of the insulating member only. The same structure may be provided in the switch 20.

The latch member 30 has a connecting end 31, and the pivoting bore 32b is adjacent to the connecting end 31. The latch member 30 is provided with a through bore 31a adjacent to the connecting end 31. A positioning pin 38 is inserted into the through bore 31a of the latch member 30 and the guiding slot 21 of the switch 20. While the positioning pin 38 moves in the guiding slot 21, it moves the latch member 30 between the unlock position and the lock position. Precisely, the positioning pin 38 arrives at the tart point 21a of the guiding slot 21 while the latch member 30 is moved to the lock position P2. In the lock position P2, as shown in FIG. 2, the resting portion 36a of the latch member 30 rests against a free end 10a of the hook member 10 to have the stop portions 36 blocking an opening of the hook member 10. While a user presses the switch 20, it will move the latch member 30 because of the engagement of the positioning pin 38. If the user presses the switch 20, it will drive the positioning pin 38 to cross the turn point 21b and arrive at the end point 21c. At the same time, the latch member 30 is moved from the lock position P2 (FIG. 2) to the unlock position P3 (FIG. 3), in which the hook member 10 is opened to hook an object or take an object off.

In an embodiment, the bodies 12, 32, 22 of the hook member 10, the latch member 30, and the switch 30 are made of metal, and the first, second, and third insulating members 26, 34 are made of an insulating material. The present invention further provides a plurality of insulating lids 50 engaging rings around opposite ends of the bores 31a 32b, and 28 to cover the pins 24, 33, and 38. In other words, all the parts on the safety hook 100 of the present invention are covered by insulating means to avoid electricity leakage.

In conclusion, the safety hook 100 of the present invention provides the insulating members and the lids to isolate the user from any conductive part of the safety hook 100, so that the user will not get electric shock in operation of the hook 100. Besides, the first insulating member includes two insulating layers 14, 16 with different colors, therefore if the second insulating layer 16 is worn to expose the first insulating layer 14, the user is easy to be aware of because of the color change. It is noted that the second and third insulating members 26, 34 may includes two insulating layers with different colors just like the first insulating member.

It must be pointed out that the embodiments described above are only some preferred embodiments of the present invention. All equivalent structures which employ the concepts disclosed in this specification and the appended claims should fall within the scope of the present invention.

What is claimed is:

1. A safety hook, comprising:
   a hook member having a body and a first insulating member covering a surface of the body;
   a switch pivoted on the hook member and having a second insulating member covering a surface of the switch, wherein the switch has a guiding slot, and the guiding slot has a start point at an end, an end point at an opposite end, and a turn point between the start point and the end point;
   a latch member pivoted on the hook member to be moved between a lock position and an unlock position and having a third insulating member covering a surface of the latch member, wherein the latch member has a connecting end; and
   a positioning pin inserted into the latch member and the guiding slot of the switch, whereby the latch member is moved between the lock position and the unlock position while the switch is moved; the latch member is moved to the lock position while the positioning pin is at the start point of the guiding slot, and the latch member is moved to the unlock position while the positioning pin is at the end point of the guiding slot.

2. The safety hook of claim 1, wherein the body of the hook member is made of metal; the first insulating member includes a first insulating layer and a second insulating layer; the first insulating layer covers the surface of the body, and the second insulating layer covers the first insulating layer; and the first insulating layer and the second insulating layer have different colors.

3. The safety hook of claim 2, wherein the first insulating layer has a plurality of protrusions projected from an outer surface thereof, and the second insulating layer has a plurality of openings; and the protrusions engage the openings respectively.

4. The safety hook of claim 3, wherein distal ends of the protrusions are even with an outer surface of the second insulating layer.

5. The safety hook of claim 2, wherein the latch member has a body, which is made of metal, and the body includes two side plates; the third insulating member covers both the side plates; the latch member is provided with a pivoting bore through the side plates and the third insulating member; the hook member is provided with a positioning bore through the body, the first insulating layer, and the second insulating layer; a pin inserted into the pivoting bore and the positioning bore to pivot the latch member on the hook member; the latch member is provided with a through bore adjacent to the connecting end; the through bore extends through the sides plates and the third insulating member; the positioning pin is inserted into the through bore and the guiding slot of the switch; the latch member has a stop portion and a resting portion; the resting portion rests against the hook member when the latch member is at the lock position.

6. The safety hook of claim 5, further comprising a plurality of insulating lids engaging opposite ends of the positing bore and the through bore.

7. The safety hook of claim 2, wherein the hook member has a positioning bore through the body, the first insulating layer, and the second insulating layer; the switch includes a body, which is made of metal, and the body includes two side plates; the second insulating member covers both the side plates; the switch has a pivoting bore through the side plates and the second insulating member; a pin is inserted into the pivoting bore and the positioning bore to pivot the switch on the hook member; the guiding slot of the switch extends through the side plates and the second insulating member; the latch member is provided with a through bore; the positioning pin is inserted into the through bore and the guiding slot.

8. The safety hook of claim 7, further comprising a plurality of insulating lids engaging opposite ends of the pivoting bore and the through bore.

* * * * *